United States Patent
Roddis

(10) Patent No.: US 6,224,061 B1
(45) Date of Patent: May 1, 2001

(54) MECHANICAL SEALS

(75) Inventor: Alan James Roddis, Sheffield (GB)

(73) Assignee: AES Engineering Limited (GB)

( * ) Notice: Subject to any disclaimer, the term of this patent is extended or adjusted under 35 U.S.C. 154(b) by 0 days.

(21) Appl. No.: 09/061,991

(22) Filed: Apr. 17, 1998

(30) Foreign Application Priority Data

Apr. 17, 1997 (GB) .................................................. 9707754

(51) Int. Cl.⁷ .................................................. F16J 15/34
(52) U.S. Cl. ........................ 277/370; 277/361; 277/388
(58) Field of Search ..................... 277/358, 361, 277/370, 387, 388, 396

(56) References Cited

U.S. PATENT DOCUMENTS

| | | | |
|---|---|---|---|
| 4,509,762 | * | 4/1985 | Garrett . |
| 4,538,820 | * | 9/1985 | Duffee .................................. 277/387 |
| 5,067,733 | * | 11/1991 | Nagai et al. .......................... 277/387 |
| 5,213,340 | * | 5/1993 | Aziber et al. ..................... 277/387 X |
| 5,324,048 | * | 6/1994 | Carmody . |
| 5,441,282 | * | 8/1995 | Ciotola ................................. 277/380 |
| 5,667,356 | * | 9/1997 | Whittier et al. ......................... 415/34 |
| 5,713,576 | * | 2/1998 | Wasser et al. ........................ 277/304 |
| 5,727,792 | * | 3/1998 | Rockwood ........................ 277/357 X |
| 5,794,939 | * | 8/1998 | Parkin ................................... 277/357 |

FOREIGN PATENT DOCUMENTS

| | | | |
|---|---|---|---|
| 2325031 | * | 11/1998 | (GB) . |
| 55-051166 | * | 4/1980 | (JP) ..................................... 277/388 |

* cited by examiner

*Primary Examiner*—Anthony Knight
*Assistant Examiner*—Alison K. Pickard
(74) *Attorney, Agent, or Firm*—Myers Bigel Sibley & Sajovec

(57) ABSTRACT

A mechanical shaft seal includes a rotary assembly and a stationary assembly each of which carry a respective mating seal face. One of the seal faces is located on a floating component mounted for axial movement with respect to the shaft. Means are provided for urging the floating component in a direction towards the other of said seal faces. A non-metallic end cap is provided to protect the seal in the case where the sealed product attacks metallic material. The end cap is arranged so that, in use, it is subjected to substantially balanced hydraulic loading.

12 Claims, 4 Drawing Sheets

MECHANICAL SEALS

This invention relates to mechanical seals and especially to non-metallic mechanical seals.

A mechanical shaft seal for separating a first liquid fluid from a second fluid includes a rotary assembly for mounting on a rotatable shaft for rotation therewith and a stationary assembly for securing to a fixed structure within which the rotary assembly is located. Such a seal includes a "floating" component which is mounted axially movably around the rotary, shaft of, for example a pump and a "static" component which is axially fixed, typically being secured to a housing. The floating component has a flat annular end face or seal face which is directed towards a complementary seal face of the static component. The floating component is urged towards the static component, usually by means of one or more springs, to close the seal faces together to form a sliding face seal. One of the floating and static components forms part of the rotary assembly and the other forms part of the stationary assembly.

Those seals whose floating component form part of the rotary assembly are described as rotary seals. If the floating component forms part of the stationary assembly the seal is referred to as a stationary seal.

If the sliding seal between the rotary and stationary components are assembled and preset prior to despatch from the mechanical seal manufacturing premises, the industry terminology for this is "cartridge seal". If the rotary and stationary components are despatched individually (unassembled) from the mechanical seal manufacturing premises, the industry terminology for this is "component seal".

Non-metallic mechanical seals commonly have, as a minimum, the "wetted" components (the components which are in contact with the sealed product) manufactured using a non-metallic material.

Non-metallic mechanical seals are therefore employed when the sealed product attacks metallic materials.

A non-metallic mechanical seal may include a non-metallic end cap associated with the rotary assembly and which separates the sealed product from other components of the seal, particularly those components which are metallic. However such a non-metallic end cap is prone to distortion due to the hydraulic forces acting on it being unbalanced, that is to say different at one longitudinal end of the end cap compared with the other end.

According to the present invention there is provided a mechanical shaft seal for separating a first liquid from a second fluid comprising:

(a) a rotary assembly for mounting on a rotatable shaft for rotation therewith;

(b) a stationary assembly for securing to a fixed structure within which the rotary assembly is located;

(c) said rotary assembly and said stationary assembly each carry a respective mating seal face;

(d) one of said seal faces being located on a floating component mounted for axial movement with respect to said shaft;

(e) means for urging the floating component in a direction towards the other of said seal faces; and (f) a non-metallic end cap which, in use, separates the first fluid from other components of the seal and which is arranged such that, in use, it is subjected to substantially balanced hydraulic loading.

Preferably the end cap is secured to the rotary assembly and sealing means are located between said end cap and said rotary assembly, said sealing means being positioned such that hydraulic pressure from said first fluid is exerted substantially equally on opposed longitudinal ends of said end cap. The sealing means preferably comprise first and second sealing members associated with respective first and second longitudinal ends of the end cap, said sealing members bearing against surfaces which are equally distanced from the longitudinal axis of the shaft seal.

The second fluid may be a gas or a liquid. In the case where it is a liquid, it is preferred that further sealing means are located between said end cap and said rotary assembly, said further sealing means being positioned such that hydraulic pressure from said second fluid is exerted substantially equally on opposed longitudinal ends of said end cap. Preferably the further sealing means comprise a third sealing member associated with a longitudinal end of the end cap, said first and third sealing members bearing against surfaces which are equally distanced from the longitudinal axis of the shaft seal.

A shaft seal of the present invention may be of rotary or a stationary mechanical seal. Furthermore it may be a single, double or triple mechanical seal.

A shaft seal of the invention may incorporate a barrier fluid system in which case the second fluid is a barrier fluid.

The present invention is described, by way of examples only, with reference to the accompanying drawings, in which.

Figure 1:
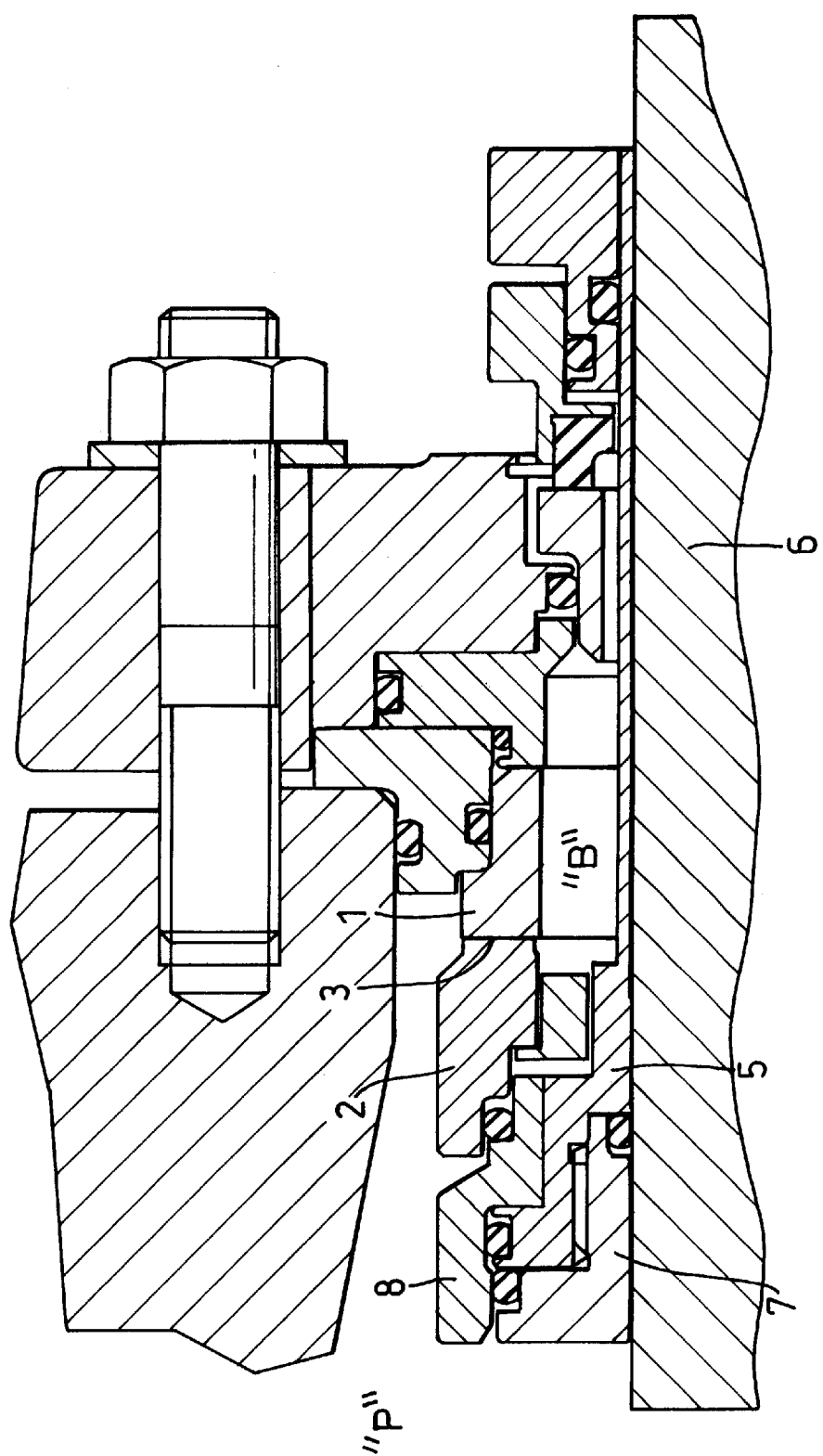
FIG. 1 is a longitudinal cross section through a double rotary mechanical seal of the invention.
Figure 3:
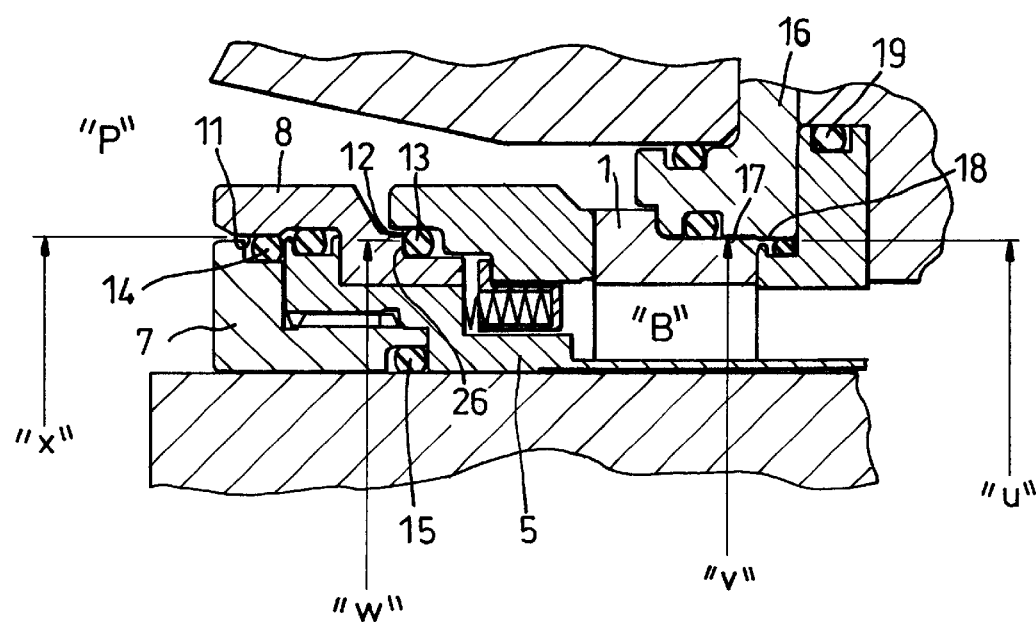
Figure 4:
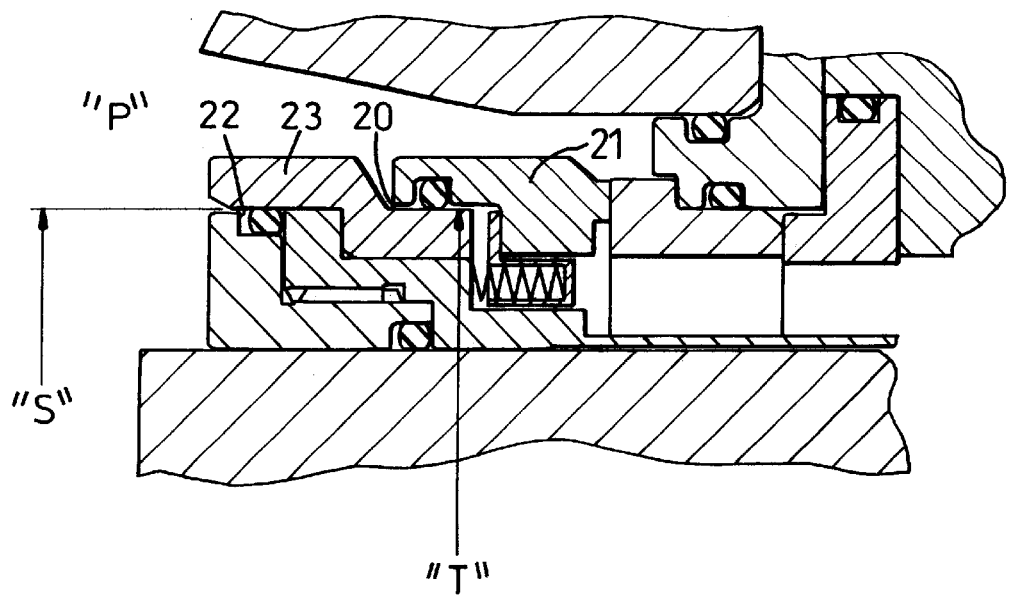
Figure 5:
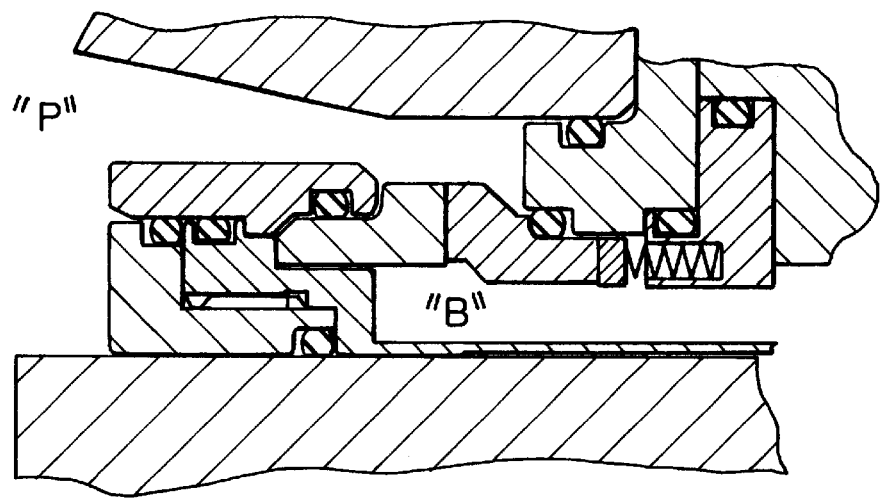
Figure 6:
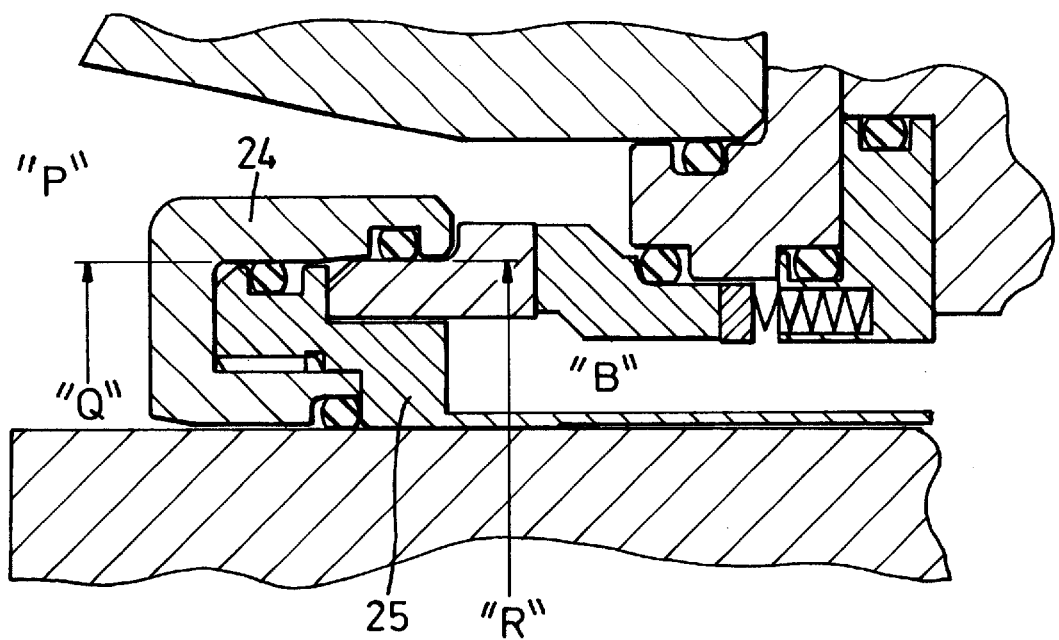

FIG. 3 corresponds to FIG. 1 but is annotated to show the area of the rotary component acted upon by product fluid pressure;

FIG. 4 corresponds to FIG. 1 but is annotated to show an alternate single seal arrangement, where no barrier fluid is present, only product fluid;

FIG. 5 is a longitudinal section through a stationary seal of the present invention; and FIG. 6 is a longitudinal section through a further stationary seal of the invention.

The present invention may be employed for both rotary seals and stationary seals and for single, double and triple mechanical seals, whether designed in a cartridge or component seal format. Furthermore, the invention may be used with metallic components as well as non-metallic components.

Referring to FIG. 1 of the accompanying drawings, a rotary double mechanical seal according to the invention is a cartridge seal and comprises a stationary component 1 and a rotary component 2 which carries a seal face which in turn forms a sliding seal 3 with the stationary component 1.

The rotary component 2 is disposed radially outwardly of rotary member 5, which is a sleeve fixed for rotation with a rotary shaft 6 of an item of mechanical equipment. The non-metallic end cap components 7 and 8 are positioned radially around the rotary member 5 and may be secured by mechanical means, chemical means, or by other means, to the rotary member 5.

Figure 2:
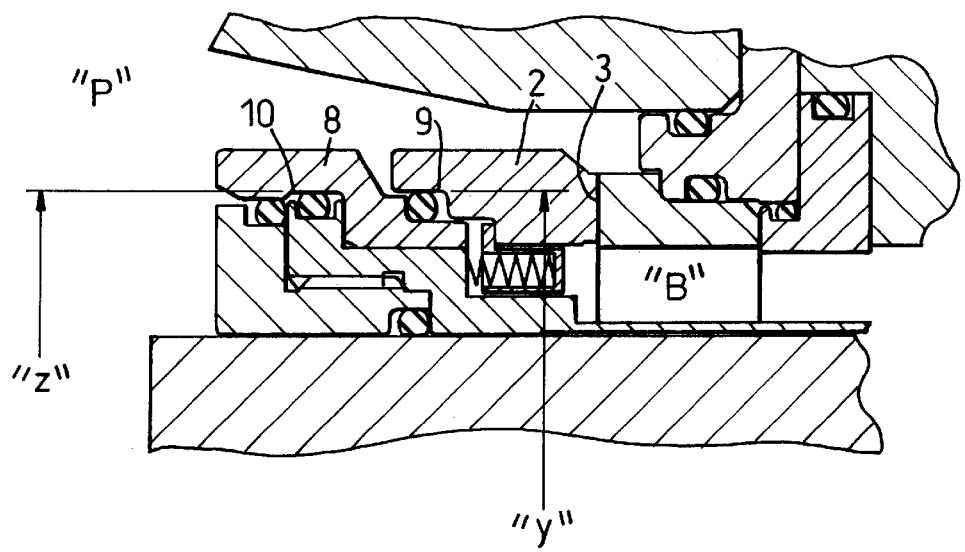
FIG. 2 is a partial longitudinal cross section corresponding to FIG. 1, annotated to show the area of the rotary component acted upon by barrier fluid pressure.

Referring to FIG. 2, letter "P" designates volume occupied by product fluid and letter "B" designates volume occupied by barrier fluid on either side of the sliding seal 3. The radially inner annular surface 9 of the rotary component 2 is exposed to barrier fluid in volume "B" at level of line 'y'. The radially inner annular surface 10 of the rotary end cap component 8 is exposed to barrier fluid in volume "B"

at level of line 'z'. As line 'z' and line 'y' are equal, the hydraulic loading on the rotary end cap component 8 from the barrier pressure is nullified.

Referring to FIG. 3, the radial inner annular surface 11 of the rotary end cap component 8 is exposed to product in volume "P" at level of the line 'x'. The radially outer line 12 of the rotary end cap component 8 is exposed to product in volume "P" at level of line 'w', assuming the barrier pressure is higher than the product pressure pushing the elastomer 13 against shoulder 26. As line 'x' and line 'w' are equal the hydraulic loading on the rotary end cap component 8 from the product pressure is nullified.

The advantage of such a design is that the non-metallic end cap is not subjected to distortion from pressure. This is of particular importance when the non-metallic material is of a plastic nature.

As rotary end cap component 7 is not in contact with barrier fluid "B" there is no hydraulic force applied by the barrier fluid.

Elastomers 14 and 15 when subjected to a positive product pressure "P" are forced against the rotary member 5 hence there is no hydraulic force applied by the product pressure acting to displace the rotary end cap component 7 from the rotary member 5.

The gland insert 16 is also manufactured from a non-metallic material.

The radially outer annular surface 17 of the stationary member 1 is exposed to barrier fluid in volume "B" at level of line 'v'. The radially inner annular surface 18 of the gland insert 16 is exposed to barrier fluid in volume "B" at level of line 'u'.

As line 'v' and line 'u' are equal and the elastomer 19 prevents barrier fluid from contacting the gland insert 16, the hydraulic loading on the gland insert component 16 from the barrier pressure is nullified.

Referring to FIG. 4, a partial longitudinal cross section of an alternate rotary single mechanical seal according to the invention is subjected to product pressure occupying volume "P" only.

The radially outer annular surface 20 of the rotary end cap component 23 is exposed to product fluid in volume "P" at level of line 'T'. The radially inner annular surface 22 of the rotary end cap component 23 is exposed to product fluid in volume "P" at level of line 'S'. As line 'T' and line 'S' are equal the hydraulic loading on the rotary end cap member 23 from the product pressure is nullified.

Referring to FIG. 5, a stationary double mechanical seal according to the invention is subjected to product pressure occupying volume "P" and barrier pressure occupying volume "B". The hydraulic loading of the invention is thus similar to those previously discussed above.

Referring to FIG. 6, a further stationary double mechanical seal according to the invention is again subjected to product pressure occupying volume "P" and barrier pressure occupying volume "B".

FIG. 6 illustrates that a single end cap 24 may be employed to achieve the desired hydraulic balanced effect as achieved by the embodiments shown in FIGS. 1 to 5, since the balance lines "R" and "Q" are equal and therefore the hydraulic loading acting to displace the end cap 24 from sleeve 25 is nullified.

Although reference is made above to lines being equal (that is, at the same radial distance from the longitudinal axis) and consequently to a hydraulic loading being nullified, slight variations on the distance between the balance lines will provide a "minimised" hydraulic loading which is still advantageous in reducing or preventing distortion of non-metallic components.

What is claimed is:

1. A mechanical shaft seal for separating a first liquid from a second fluid, said mechanical shaft seal comprising:
   (a) a rotary assembly for mounting on a rotatable shaft for rotation therewith;
   (b) a stationary assembly for securing to a fixed structure within which the rotary assembly is located;
   (c) said rotary assembly and said stationary assembly each carry a respective mating seal face;
   (d) one of said seal faces being located on a floating component mounted for axial movement with respect to said shaft;
   (e) means for urging the floating component in a direction towards the other of said seal faces; and
   (f) a non-metallic end cap coupled to said rotary assembly via sealing means located between said end cap and said rotary assembly, said sealing means comprising first and second sealing members associated with respective first and second longitudinally spaced portions of the end cap, said sealing members bearing against surfaces which are equally spaced from the longitudinal axis of the shaft seal so that at least one of the first liquid fluid and second liquid fluid acts on said opposed longitudinally spaced portions of the end cap to substantially the same level with respect to the longitudinal axis of the shaft seal such that there is no net hydraulic force acting to displace the end cap from the rotary assembly.

2. A shaft seal according to claim 1 further comprising further sealing means located between said end cap and said rotary assembly, said further sealing means being positioned such that hydraulic loading is exerted substantially equally on opposed longitudinally spaced portions of said end cap when said end cap separates the first liquid fluid from the second fluid.

3. A shaft seal according to claim 2 wherein said further sealing means comprises a third sealing member associated with a third longitudinally spaced portion of the end cap, said first and third sealing members bearing against surfaces which are equally distanced from the longitudinal axis of the shaft seal.

4. A shaft seal according to claim 3 further comprising a first and a second fluid, wherein said shaft seal separates the first fluid from the second fluid, and wherein the second fluid is a liquid.

5. A shaft seal according to claim 4 wherein the shaft seal incorporates a barrier fluid system and the second fluid is a barrier fluid.

6. A shaft seal according to claim 1 further comprising a first and a second fluid, wherein said shaft seal separates the first fluid from the second fluid, and wherein the second fluid is a gas.

7. A shaft seal according to claim 1 which is a rotary mechanical seal.

8. A shaft seal according to claim 1 which is a stationary mechanical seal.

9. A shaft seal according to claim 1 which is a single mechanical seal.

10. A shaft seal according to claim 1 which is a double mechanical seal.

11. A mechanical shaft seal having a stationary assembly and a rotary assembly, said rotary assembly comprising:
   (a) a rotary member coupled to a rotatable shaft having a longitudinal axis;
   (b) a rotary component disposed radially outwardly of the rotary member; and (c) a non-metallic end cap coupled to said rotary member and to said rotary component, said end cap configured to be subjected to substantially balanced hydraulic loading when separating a first liquid fluid from other components of the seal;
  a first sealing member positioned between said non-metallic end cap and said rotary component;
  a second sealing member contacting said non-metallic end cap and said rotary member;
  wherein said first and second sealing members bear against longitudinally extending surfaces of the rotary assembly, said longitudinally extending surfaces being equally distanced from the longitudinal axis of said rotatable shaft such that hydraulic loading is exerted substantially equally on opposed longitudinally spaced portions of said end cap when said end cap separates a first liquid from other components of the seal; and
  a third sealing member positioned between said end cap and said rotary member, wherein said first and third sealing members bear against longitudinally extending surfaces of the rotary assembly that are equally distanced from the longitudinal axis of said rotatable shaft such that hydraulic force is exerted substantially equally on opposed longitudinally spaced portions of said end cap when said end cap separates a first fluid from a second fluid.

12. A shaft seal according to claim 11 further comprising a first and a second fluid, wherein said shaft seal separates the first fluid from the second fluid.

* * * * *